United States Patent [19]
Smith

[11] Patent Number: 5,597,192
[45] Date of Patent: Jan. 28, 1997

[54] PIPE PULLING DEVICE

[76] Inventor: David J. Smith, 506 Smithdale St., Winston-Salem, N.C. 27107

[21] Appl. No.: 171,452

[22] Filed: Dec. 22, 1993

[51] Int. Cl.⁶ .................................................. B66C 1/56
[52] U.S. Cl. ............................................................ 294/96
[58] Field of Search .......................... 294/86.24, 86.25, 294/89, 93–96; 279/2.11, 2.12, 2.14, 2.15

[56] References Cited

U.S. PATENT DOCUMENTS

| | | | |
|---|---|---|---|
| 2,563,675 | 8/1951 | Edwards | 294/96 |
| 2,624,610 | 1/1953 | Murphy | 294/96 |
| 2,642,768 | 6/1953 | Ogburn | 294/95 X |
| 2,687,324 | 8/1954 | Grunsky et al. | 294/96 |
| 2,719,747 | 10/1955 | Layne | 294/89 |
| 2,939,739 | 6/1960 | Grunsky | 294/96 |
| 3,492,032 | 1/1970 | Deike | 294/94 X |
| 3,709,546 | 1/1973 | Vaughan | 294/96 |

FOREIGN PATENT DOCUMENTS

| | | | |
|---|---|---|---|
| 1172860 | 8/1985 | U.S.S.R. | 294/96 |

*Primary Examiner*—Johnny D. Cherry

[57] ABSTRACT

A pipe pulling device having a multiple section body portion with a substantially hollow interior, a cap engagable with a pulling device and having a threaded member extending into the body portion hollow interior, and a securing plug having a threaded conically shaped front portion suitable to cooperatively receive and secure the cap threaded member so that as the member continues to be threadably received, the plug front portion is urged into the body portion hollow interior and the body portion sections are separated and expanded to grippingly engage the pipe interior and enable the pipe to be pulled by the pulling device connected to the cap.

11 Claims, 1 Drawing Sheet

PIPE PULLING DEVICE

BACKGROUND OF THE INVENTION

1. Field of the Invention

The present invention relates generally to devices for pulling conduit or pipe and more particularly with an expandable device secured to the interior of a conduit or pipe that can be engaged by a pulling device.

2. Description of the Prior Art

Numerous pipe pulling and replacement devices are known that are primarily directed to the removal and replacement of larger sections of pipe or conduit generally greater than 6 to 10 inches in diameter. Representative of those devices are U.S. Pat. Nos. 4,637,756; 4,787,463; 5,048,793; and 5,174,664.

Replacing or installing new small diameter pipe or conduit such as water lines has not been practically accomplished by the use of special equipment. This type of conduit is generally installed by drilling or boring an opening of about 4 inches in diameter when pipe up to 2 inches in diameter is to be installed. The leading end of the pipe is then installed into such an opening and tied onto a rope or cable that has been extended from the other side of the opening for engagement therewith. Installation proceeds by several individuals on the far end of the cable pulling while one or more individuals on the pipe engaging end of the cable feed and force the pipe to the extent possible through the opening.

As is obvious, such an installation procedure is difficult, tiring, inefficient and time consuming. Moreover, no device or fixture has been available to secure the end of the pipe in a manner that will not engage the wall of the opening and thereby impede its movement. Consequently, no exceptional amount of force can be used in pulling the pipe from the opposite end of the opening because of the lack heretofore of a suitable connecting element joining the pulling cable to the pipe end. It is with these problems in mind that the present invention has been developed.

OBJECTIVES AND SUMMARY OF THE INVENTION

It is therefore a primary object of the present invention to provide a device that can be releasably secured to the leading end of a conduit so that a section of that conduit can be pulled with great force through a created opening for an extended length.

Another object of the present invention is to provide a device of the type described which is simple in construction, reliable in use, and efficiently operable.

Applicant's invention is a pipe pulling device having a sectional body portion forming a substantially circular outer surface and a hollow interior that will expandably cooperate with a cap with a threaded member and a securing plug with a threaded front tapering member that will movably slide within the interior of the body portion sections to separate and expand them until they engage the interior of the pipe and secure the device to that interior so that the pipe can be pulled by a pulling means. The cap has some appendage that is suitable to connect with a pulling cable such as a hook, and the body portion sections are generally held together by a coiled spring or similar device encircling their outer surfaces.

From the objectives and summary set forth above, other objectives and advantages of the present invention will become more apparent after consideration of the following detailed description and accompanying drawings wherein like characters of reference designate like parts throughout the several views.

DESCRIPTION OF THE PREFERRED EMBODIMENT

Figure 1:
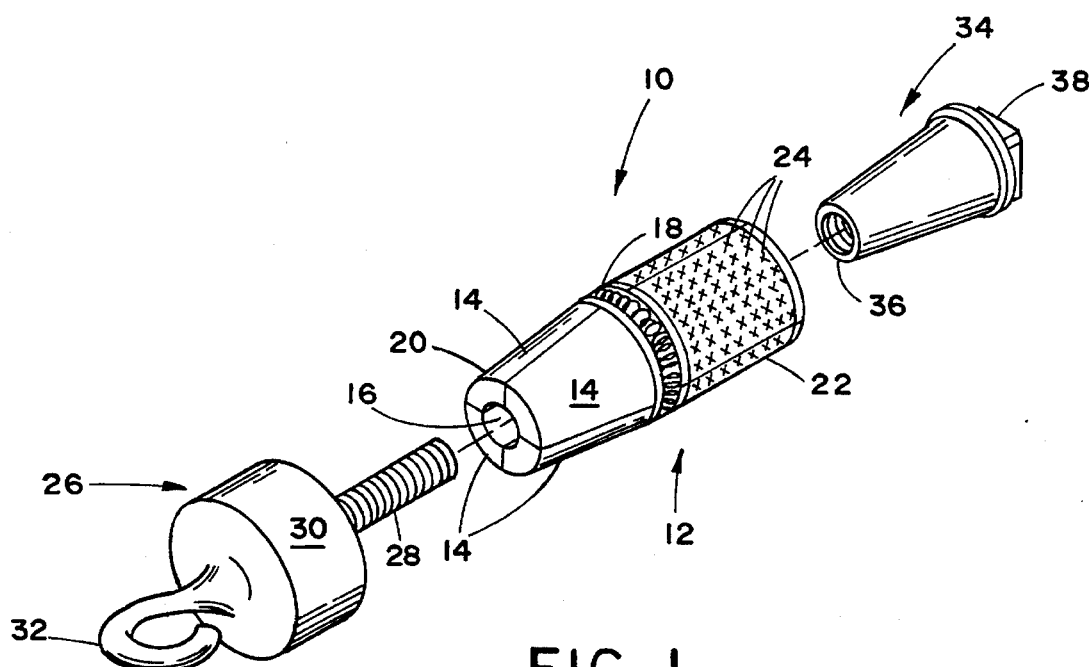
FIG. 1 is a perspective partially exploded view of the pipe pulling device comprising the present invention showing the body portion, cap, and securing plug in alignment for subsequent assembly.

Referring now to the drawings and in particular to FIG. 1, the pipe pulling device of the present invention shown generally as 10 is made up of a body portion 12 formed from a plurality of sections 14. When sections 14 are fitted together, they have a substantially circular outer surface and a hollow interior 16 whose interior surface is also substantially circular. Suitable retaining means such as a coiled spring 18 encircling the outer surface holds the sections in position.

Each body portion 14 has a tapered front portion 20 and a substantially cylindrical rear area 22. The substantially rear area 22 has a plurality of rough gripping elements or knurls 24 useful in gripping the interior surface of the conduit subsequently to be described.

A cap shown generally as 26 includes a threaded member 28 and an end section 30 to which is fastened means for engaging an external pulling cable such as a hook 32 like that shown in FIG. 1. The opening in interior 16 is larger than the diameter of the threaded member 28 so that threaded member 28 can move easily through the hole and into the interior 16 of body portion 12.

A securing plug shown generally as 34 has a threaded front portion 36 and a larger rear portion 38. Plug 34 is tapered forwardly and generally consistently with the taper of interior 16 of body portion 12. The substantially cylindrical rear areas 22 of sections 14 are opened to cooperatively receive securing plug 34.

Figure 2:
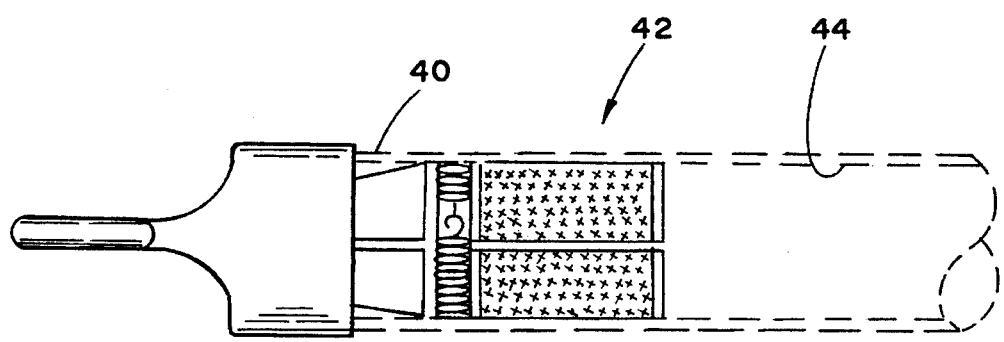
FIG. 2 is a side elevational view of the present invention shown in the installed position with an end of the conduit to be pulled.

In operation, cap 26 is extended through body portion 12 and slightly threaded into plug threaded front 36. Thus all three components are joined together in a rather loose manner but with sufficient stability to be inserted in the forward or leading edge 40 of a conduit 42 shown in dotted lines in FIG. 2. After thus being positioned, threaded member 28 is threadably received by threaded front 36 continuously until plug 34 is urged into cavity 16 and begins to engage and separate sections 14 so that they move outwardly and ultimately against the interior 44 of conduit 42. This engagement is grippingly secure and sufficient in intensity to enable a large force to be exerted through hook 32 to pull conduit 42 through an opening for a considerable length. After the installation has been completed, device 10 is easily disconnected from conduit 40 by unthreading threaded member 28 from threaded front 36.

While any number of body portion sections 14 may be used, it has been found most efficient and economical to utilize four as shown in FIG. 1. A very satisfactory distribution of gripping force is available through this combination.

Thus a very practical and economical pipe pulling device has been illustrated and described. With respect to the description provided, it is to be noted that the optimum dimensional relationship to the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed herein.

With respect to the above description, it is to be realized that the optimum dimensional relationships for the parts of the invention, to include variations in size, materials, shape, form, function, and manner of operation, assembly and use, are deemed readily apparent and obvious to one skilled in the art, and all equivalent relationships to those illustrated in the drawings and described in the specification are intended to be encompassed herein.

Therefore, the foregoing is considered as illustrative only of the principles of the invention. Further, since numerous modifications and changes will readily occur to those skilled in the art, it is not desired to limit the invention to the exact construction and operation shown and described. All suitable modifications and equivalents that fall within the scope of the appended claims are deemed within the present inventive concept.

What is claimed is:

1. A pipe pulling device for pulling a pipe with pulling means, the pipe having an open interior, the device comprising: a body portion for placement within the pipe interior having a plurality of discrete sections forming a substantially frusto conical circular outer surface and a hollow interior with a substantially frusto conical circular interior surface; means releasably retaining the discrete body portion sections in a configuration to form the substantially frusto conical circular outer surface and the hollow interior with a substantially frusto conical circular interior surface; a cap having a threaded member extending into the body portion hollow interior; and a securing plug positionable within the pipe interior and having a threaded front, a larger rear portion, and a frusto conical circular exterior surface, the plug threaded front cooperatively receiving and securing the cap threaded member, the discrete body portion sections separating each from the other and expanding as the plug threaded front continues to receive the cap threaded member and the plug frusto conical circular exterior surface mates with the hollow interior substantially frusto conical circular interior surface to engage and secure the pipe interior so that the pipe can be pulled at the cap by the pulling means.

2. The device as claimed in claim 1 wherein the discrete body portion sections have tapering front areas and substantially cylindrical rear areas.

3. The device as claimed in claim 2 wherein the cap includes hook means for connection with the pulling means.

4. The device as claimed in claim 2 wherein the retaining means is a coiled spring extending around the body portion sections outer surfaces.

5. The device as claimed in claim 2 wherein the number of body portion sections is four.

6. The device as claimed in claim 1 wherein the cap includes hook means for connection with the pulling means.

7. The device as claimed in claim 6 wherein the retaining means is a coiled spring extending around the body portion sections outer surfaces.

8. The device as claimed in claim 6 wherein the number of body portions sections is four.

9. The device as claimed in claim 1 wherein the retaining means is a coiled spring extending circumferentially around the substantially circular outer surface.

10. The device as claimed in claim 9 wherein the number of body portion sections is four.

11. The device as claimed in claim 1 wherein the number of body portion sections is four.

\* \* \* \* \*